United States Patent [19]
Emmer et al.

[11] Patent Number: 6,085,089
[45] Date of Patent: Jul. 4, 2000

[54] METHOD AND ARRANGEMENT FOR SETTING UP A TRAFFIC CHANNEL CONNECTION IN A MOBILE RADIOTELEPHONE NETWORK

[75] Inventors: Dieter Emmer, Germering; Michael Koch, München; Bernhard Michels, Dachau, all of Germany

[73] Assignee: Siemens Aktiengesellschaft, Munich, Germany

[21] Appl. No.: 08/992,180

[22] Filed: Dec. 17, 1997

[30] Foreign Application Priority Data

Dec. 20, 1996 [DE] Germany ............................ 196 53 468

[51] Int. Cl.$^7$ .............................. H04Q 7/20; H04Q 7/22; H04Q 7/38
[52] U.S. Cl. ............................ 455/439; 455/445; 455/439; 455/448; 455/422; 455/424; 455/522; 370/327; 370/331; 370/340
[58] Field of Search .................................... 455/445, 439, 455/448, 438, 550, 561, 560, 422, 424, 426, 403, 552, 500, 524, 522; 370/493, 494, 495, 327, 331, 340

[56] References Cited

U.S. PATENT DOCUMENTS 5,761,195 6/1998 Lu et al. .................................. 455/445
5,884,148 3/1999 Bilgic et al. ............................ 455/445

Primary Examiner—Wellington Chin
Assistant Examiner—Keith Ferguson
Attorney, Agent, or Firm—Hill & Simpson

[57] ABSTRACT

For setting up a traffic channel connection between an originating mobile station and a destination mobile station of a mobile radiotelephone network, the network having at least two base stations, a base station control unit that controls these, and a mobile switching center connected with this control unit via a transcoding and rate adaption unit, a connection request is signaled from an originating mobile station requesting connection to a destination mobile station via the mobile switching center. Using a database, the mobile switching center determines via which base station the desired destination mobile station can be reached. The transcoding and rate adaption unit contains a switching stage for the traffic channel connection setup, which switches a traffic channel connection between the originating mobile station and the destination mobile station.

3 Claims, 1 Drawing Sheet

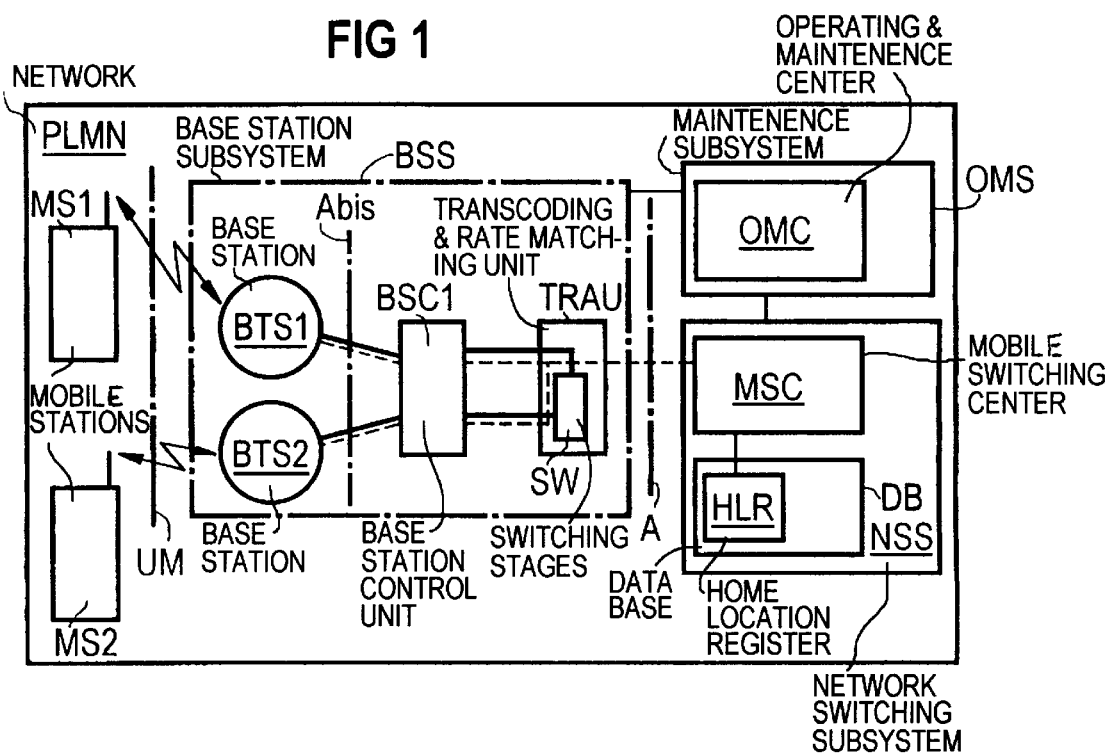
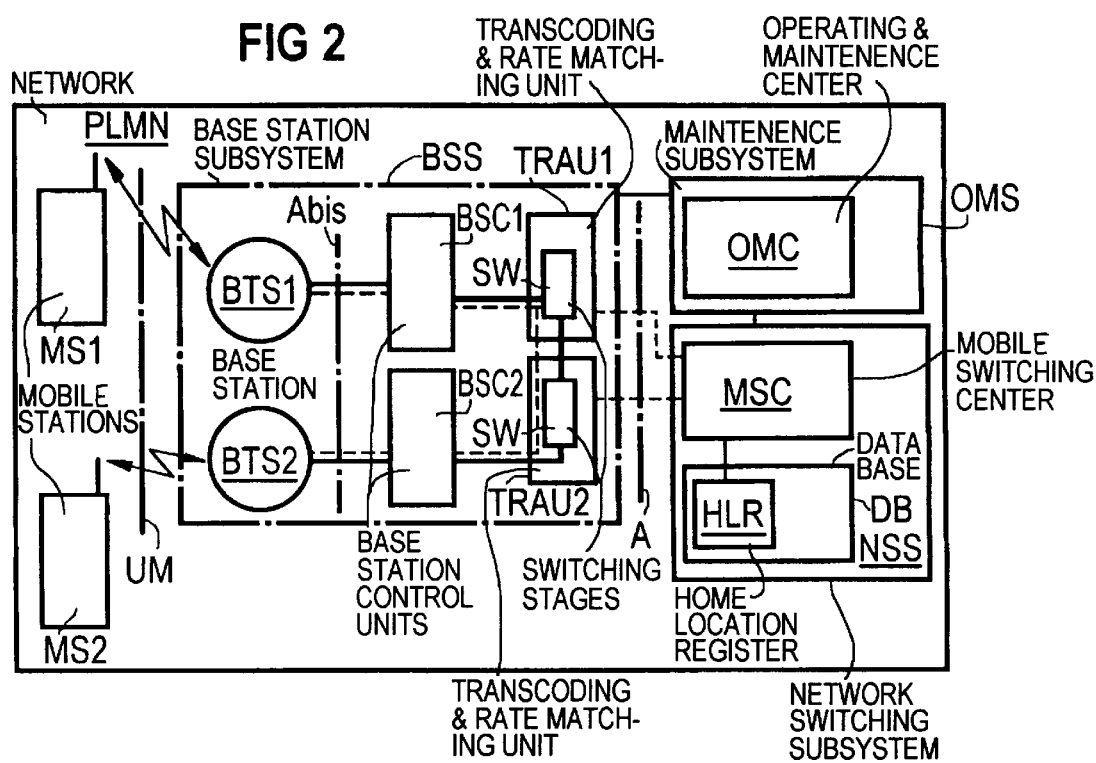

METHOD AND ARRANGEMENT FOR SETTING UP A TRAFFIC CHANNEL CONNECTION IN A MOBILE RADIOTELEPHONE NETWORK

BACKGROUND OF THE INVENTION

1. Field of the Invention

The present invention relates to a method for setting up a traffic channel connection between mobile stations of a mobile radiotelephone network with radio base stations, a radio base station control unit that controls the radio base station, and a mobile switching center physically connected with this control unit via a transcoding and rate adaption unit. In addition, the invention relates to arrangements for implementing such a method.

2. Description of the Prior Art

Mobile radiotelephone networks, are generally specified according to the ETSI recommendation GSM. "GSM" is currently used as an abbreviation for the English expression "Global System for Mobile Communications", and there are three basic classifications: the GSM900 class, wherein the radio system operates with a carrier frequency in the 900 MHZ range, the DCS1800 class, wherein the radio system operates with a carrier frequency in the 1.8 GHz range, and the PCS 1900 system, operating with a carrier frequency of 1.9 GHz.

The GSM network is hierarchically organized into several subsystems, namely a radio subsystem RSS, a network switching subsystem NSS and an operation and maintenance subsystem OMS.

The radio subsystem RSS contains the mobile telephones, which are also called mobile stations MS and which respectively communicate via radio with the nearest base station, also called the base transceiver station BTS. The base stations are part of the base station subsystem, within which they can maintain traffic channel connections and signaling channel connections via so-called Abis interfaces to base station control units BSC, and can be controlled by these base station control units. The base station control units can be connected with the network switching subsystem via transcoding and rate adaption units TRAU through traffic channels and signaling channels, in particular with mobile switching centers of the network switching subsystem, which are also designated mobile switching center MSC. The interface between the base station subsystem BSS and the network switching subsystem NSS is designated A-interface. Besides at least one mobile switching center, the network switching subsystem NSS also contains a database system, in order to be able to execute the switching and management tasks that arise. Important registers of this database system include, for example, the home location register HLR, in which personal subscriber information, such as e.g. telephone number, services cleared for the subscriber, home location to which the subscriber is allocated and his current location, are stored. Moreover, there is a visitor location register VLR that contains the dynamic subscriber data. This register comes to contain local databases allocated to the area. Copies of the home location registers for those users currently located in the coverage area of such a visitor register VLR are maintained in these databases. In addition, the database system of the network switching subsystem contains an authentication center AUC that contains the access data of the individual subscribers, in particular the secret SIM card key personally allocated to a subscriber, which is required for the access of the subscriber to the mobile radiotelephone network, as well as for the coded transmission of the speech data via the network. In addition, there is an apparatus database with terminal-apparatus-specific data, also designated equipment identity register EIR.

When a subscriber sends a connection request from a mobile station registered in a mobile radiotelephone network in the manner described above to another mobile station of this mobile radiotelephone network, this connection request is signaled by means of a signal transmission via the base station BTS in whose radio area he is located, via the base station control unit BSC that controls this base station BTS, and via the transcoding and rate adaption unit TRAU allocated to this base station control unit BSC, to a mobile switching center MSC allocated to this transcoding and rate adaption unit. Using a database—here using the home location register HLR—the mobile switching center determines which of the base stations can be used to reach the mobile station to which a connection request was signaled. After an authentication process between the mobile switching center and the destination mobile station, the mobile switching center of the network switching subsystem produces a switching through of the traffic channel connection between the two mobile stations. This traffic channel connection is routed, by the originating mobile station emitting the connection request, via the base station nearest this originating mobile station, via the base station control unit allocated to this base station, via a transcoding and rate adaption unit, via a switching stage in the mobile switching center, via a transcoding and rate adaption unit, via a base station control unit and via a base station located nearest the destination mobile station. Traffic channel connections for a very large area with a very large number of mobile stations are always switched via a single mobile switching center.

Since a large portion of connections between mobile stations of a mobile radiotelephone network are required within a spatially limited region, and each traffic channel connection requires a channel bandwidth from an element of the base station subsystem to the mobile switching center, and likewise requires such a bandwidth from the mobile switching center to this element of the base station subsystem, the transmission line network between these base station subsystem elements and the mobile switching center is heavily loaded.

SUMMARY OF THE INVENTION

It is an object of the present invention to provide a method for setting up a traffic channel connection between two mobile stations of a mobile radiotelephone network that loads the line-limited transmission network of a mobile radiotelephone network less heavily. In addition, it is an object of the invention to provide network components of a mobile radiotelephone network that enable such a method to be carried out.

The invention is based on a method for setting up a traffic channel connection between an originating mobile station and a destination mobile station of a mobile radiotelephone network having at least two base stations, a base station control unit that controls these base stations, and a mobile switching center connected physically with this control unit via a transcoding and rate adaption unit. In such a method, a connection request is signaled by means of signaling to the mobile switching center by the originating mobile station, and, using a database, the mobile switching center determines via which radio base station the desired destination mobile station can be reached. According to the invention, the transcoding and rate adaption unit has a switching stage for the traffic channel setup, and switches a traffic channel connection between the originating mobile station and the destination mobile station.

Placing the switching stage for the switching of the traffic channel connection in the transcoding and rate adaption unit saves a traffic channel connection (which is present in conventional systems) from the transcoding and rate adaption unit to the switching stage of the mobile switching center and from this center back to the transcoding and rate adaption unit. The mobile switching center provides all the items of information concerning the state of a traffic channel connection that are required for fee metering. For the authentification of the mobile stations and for the localization of the mobile stations by the mobile switching center, only narrow-band signaling channel connections are required between the base station control unit BSC and the mobile switching center. The signaling mechanisms between the base control unit BSC and the mobile switching center ensure that, given a change of radio area of a mobile station to which there exists a traffic channel connection, the required transfer mechanisms are carried out for transferring a traffic channel connection to other base stations, to other base station control units as warranted and, as warranted, to another transcoding and rate adaption unit.

Thus, the transcoding and rate adaption unit is preferably caused by the mobile switching center to switch a traffic channel connection between the originating mobile station and the destination mobile station.

In an embodiment of a method according to the invention, the transcoding and rate adaption unit then switches a traffic channel connection between the originating mobile station and the destination mobile station when the mobile switching center determines that the destination mobile station can be reached via the same transcoding and rate adaption unit as the originating mobile station.

For this purpose, in such a transcoding and rate adaption unit, or coupled thereto, a switching stage, such as e.g. a switching matrix, is required, which can connect to traffic channel connections going to base station control units connected to the transcoding and rate adaption unit. As long as the originating mobile station and the destination mobile station communicate via the same base station, or via two base stations that are controlled by the same base station control unit, or via two base stations that are controlled via different base station control units, which are in turn connected to the same transcoding and rate adaption unit, the traffic channel connection is switched via the transcoding and rate adaption unit, while maintaining all mobility functions. If, by change of location, one of the mobile stations changes to the area of a base station that is to be connected to the mobile switching center via another transcoding and rate adaption unit, the traffic channel connection in a transcoding and rate adaption unit according to the specified exemplary embodiment is through-connected via the mobile switching center.

A preferred embodiment of a base station subsystem according to the invention, having at least two base stations, at least two base station control units, each controlling at least one base station, and at least two transcoding and rate adaption units, each connecting at least one base station control unit with a mobile switching center, has a switching stage allocated to both transcoding and rate adaption units, in order to switch a traffic channel connection via a connection existing between this transcoding and rate adaption unit and via a respective base station control unit. Such a switching stage can, for example, be formed by respective switching matrices allocated to the transcoding and rate adaption units, each matrix interconnecting traffic channels, going from the transcoding and rate adaption unit allocated thereto to the base station control units, with traffic channels going to other transcoding and rate adaption units.

Such a base station subsystem enables the switching of a traffic channel from a mobile station to a further mobile station, via a base station, a base station control unit, a transcoding and rate adaption unit, a further transcoding and rate adaption unit, a further base station control unit and a further base station.

The aforementioned switching stage of a transcoding and rate adaption unit is preferably constructed so that it can switch through traffic channels going from the transcoding and rate adaption unit to which it is allocated to base station control units, and so that it also can switch through traffic channels between transcoding and rate adaption units.

In stating above that a switching stage is allocated to a transcoding and rate adaption unit, this means that the transcoding and rate adaption unit has been expanded by this switching stage, and thus differs from a conventional means by the inclusion of a known transcoding and rate adaption unit.

In a mobile radiotelephone network with a base station subsystem described above, in a further embodiment of a method according to the invention for setting up a traffic channel connection, the mobile switching center causes the switching of a traffic channel connection between the originating mobile station and the destination mobile station, including the traffic channel connection between a first and a second transcoding and rate adaption unit, if the center determines that the originating mobile station can be reached by the mobile switching center via a first transcoding and rate adaption unit, and moreover, that the destination mobile station can be reached by the mobile switching center via a second transcoding and rate adaption unit, and that in addition a traffic channel connection can be switched between the first and the second transcoding and rate adaption unit.

Accordingly, the database system used by the mobile switching center to determine the routing path of a traffic channel connection is expanded so that the mobile switching center can recognize whether a traffic channel connection can be switched immediately between two transcoding and rate adaption units that lie in the routing path of a traffic channel connection.

DESCRIPTION OF THE DRAWINGS

FIG. 1 is a block diagram illustrating the basic components of a mobile radiotelephone network with a transcoding and rate adaption unit constructed and operating in accordance with the invention.

FIG. 2 is a block diagram illustrating the basic components of a mobile radiotelephone network with an inventive base station subsystem and inventive transcoding and rate adaption units.

DESCRIPTION OF THE PREFERRED EMBODIMENTS

FIG. 1 shows, as one exemplary embodiment, a public country-based mobile radiotelephone network PLMN with two mobile stations MS1 and MS2, which communicate via an air interface UM with respective base stations BTS1 and BTS2 of a base station subsystem BSS, which in turn communicates with a connection network subsystem NSS that is connected with the base station subsystem BSS via an interface A. The network PLMN also includes an operation and maintenance subsystem OMS that acts both on the connection network subsystem NSS and on the base station subsystem BSS. In the operation and maintenance subsystem OMS, an operation and maintenance center OMC is shown as an example, which, within the operation and maintenance subsystem OMS, remotely controls the monitoring procedures.

The base stations BTS1 and BTS2 communicate with a base station control unit BSC1 via an interface Abis, which is connected with a mobile switching center MSC of the connection network subsystem NSS via a transcoding and rate adaption unit TRAU and the aforementioned interface A. The connection network subsystem NSS contains, besides the mobile switching center MSC, another database system DB serving as a database. The database system DB contains registers, of which the home location register HLR is shown as an example in FIG. 1.

The design and the cooperation of the recited components of the mobile radiotelephone network PLMN described thus far is generally known, and need not be explained in more detail herein.

If in the exemplary embodiment according to FIG. 1 a connection is set up from the mobile station MS1, as an originating mobile station, to the mobile station MS2, as the destination mobile station, signals are first transmitted via a signaling channel from the mobile station MS1 via the base station BTS1, the base station control unit BSC1 and the transcoding and rate adaption unit TRAU to the mobile switching center MSC. The mobile switching center MSC checks the access authorization of the mobile station MS1 to the mobile radiotelephone network PLMN, and determines, using the home location register HLR, the current location of the destination mobile station MS2. By means of an exchange of signals via a signaling channel between the mobile switching center MSC and the mobile station MS2 via the transcoding and rate adaption unit TRAU, the base station control unit BSC1 and the base station BTS2, the access authorization of the mobile station MS2 is then checked, and the mobile switching center MSC thereupon causes the switching through of a traffic channel connection from the originating mobile station MS1 to the destination mobile station MS2. For facilitating this explanation, the signaling channel connections between the base stations BTS1 and BTS2 and the mobile switching center MSC are shown with broken lines.

According to the invention, and according to the exemplary embodiment shown in FIG. 1, the transcoding and rate adaption unit TRAU contains a switching stage SW for switching through both of the traffic channel connections respectively arriving from the base stations BTS1 and BTS2 via the base station control unit BSC1, which are represented in FIG. 1 by bold solid lines. The transcoding and rate adaption unit TRAU communicates with the switching stage SW in a manner which does not occupy or employ spectral bandwidth, e.g., via one or more direct (wired) electrical connections.

The mobile radiotelephone network PLMN according to the exemplary embodiment of FIG. 2 differs from the mobile radiotelephone network PLMN according to the exemplary embodiment of FIG. 1 in that the base station BTS1 can be connected with the mobile switching center MSC via a first base station control unit BSC1 and a first transcoding and rate adaption unit, and the base station BTS2 can be connected with the mobile switching center MSC via a second base station control unit BSC2 and a second transcoding and rate adaption unit TRAU2. In addition, the switching stage SW in the transcoding and rate adaption units TRAU1 and TRAU2 are suited not only for switching through traffic channel connections going to base station control units BSC1 and BSC2, but also for switching through a traffic channel connection between the two transcoding and rate adaption units TRAU1 and TRAU2.

In the exemplary embodiment according to FIG. 2, given a connection setup from the mobile station MS1, as an originating mobile station, to the mobile station MS2, as the destination mobile station, the signaling between the mobile station MS1 and the mobile switching center MSC, as well as between the mobile station MS2 and the mobile switching center MSC, takes place in a manner analogous to the exemplary embodiment according to FIG. 1. In order to enable the transmission of suitable signals to cause the setting up of a traffic channel connection between the originating mobile station MS1 and the destination mobile station MS2, the mobile switching center MSC first determines, in the home location register HLR, the current location of the destination mobile station MS2, or the base station BTS2, via which the destination mobile station MS2 can be reached. The destination mobile station MS2 then checks whether the originating mobile station MS1 and the destination mobile station MS2 can be reached via the same transcoding and rate adaption unit TRAU1, or, if not, whether a traffic channel connection can be switched through between the two transcoding and rate adaption units TRAU1 and TRAU2, via which the originating mobile station and the destination mobile station MS1 and MS2 can be reached.

In the exemplary embodiment according to FIG. 2, a traffic channel connection can be switched through between the two transcoding and rate adaption units, using the switching stage SW, so that the mobile switching center MSC emits a signaling to the two transcoding and rate adaption units TRAU1 and TRAU2 for the switching through of a traffic channel connection between the two mobile stations MS1 and MS2.

Of course, the topology of a mobile radiotelephone network in which a method according to the invention can be carried out is not limited to the two exemplary embodiments shown, but rather, for example, may contain components of both examples in combination.

Thus, according to the invention a connection can also, for example, be set up from a mobile station to a second mobile station via a first base station, a base station control unit controlling this base station, an inventive transcoding and rate adaption unit, a second base station control unit, and a second base station.

Of course, a traffic channel connection can also be connected through between two mobile stations coupled to the same base station in the base station subsystem BSS, using a transcoder and rate matching unit TRAU arranged downstream from these base stations.

Deviating from the network topology according to the exemplary embodiment of FIG. 2, the two transcoder and rate matching units TRAU1 and TRAU2 can be connected with different mobile switching centers MSC of the connection network subsystem NSS, and nonetheless can switch a traffic channel connection while bypassing the mobile switching centers.

Although further modifications and changes may be suggested by those skilled in the art, it is the intention of the inventors to embody within the patent warranted hereon all changes and modifications as reasonably and properly come within the scope of their contribution to the art.

We claim:

1. In a mobile radiotelephone network having at least two mobile stations, at least two base stations, a base station control unit which controls said at least two base stations, and a mobile switching center physically connected to the base station control unit via a transcoding and rate adaption unit, a method for setting up a traffic channel connection between one of said mobile stations as an originating mobile station and another of said mobile stations as a destination mobile station, said method comprising the steps of:

from said originating mobile station, signaling a request to said mobile switching center to produce a connection from the originating mobile station to the destination mobile station;

using a database at said mobile switching center, determining through which of said at least two base stations said destination mobile station can be reached;

in a switching stage, producing a switched connection for setting up the traffic channel connection requested between said originating mobile station and said destination mobile station;

placing said switching stage in said transcoding and rate adaption unit; and causing said transcoding and rate adaption unit to produce said traffic channel connection if said mobile switching center determines that said destination mobile station can be reached by said mobile switching center via a same transcoding and rate adaption unit as said originating mobile station.

2. In a mobile radiotelephone network having at least two mobile stations, at least two base stations respectively communicating with said at least two mobile stations, a first base station control unit connected to a first of said base stations and a second base station control unit connected to a second of said base stations, and a mobile switching center physically connected to said first base station control unit via a first transcoding and rate adaption unit and to said second base station control unit via a second transcoding and rate adaption unit, said second transcoding and rate adaption unit having a traffic channel connection to said first transcoding and rate adaption unit, a method for setting up a traffic channel connection between one of said mobile stations as an originating mobile station and another of said mobile stations as a destination mobile station, said method comprising the steps of:

from said originating mobile station, signaling a request to said mobile switching center to produce a connection from the originating mobile station to the destination mobile station;

using a database at said mobile switching center, determining through which of said at least two base stations said destination mobile station can be reached;

in a switching stage, producing a switched connection for setting up the traffic channel connection requested between said originating mobile station and said destination mobile station;

placing said switching stage in said transcoding and rate adaption unit; and said mobile switching center producing said traffic channel connection between said originating mobile station and said destination mobile station including said traffic channel connection between said first transcoding and rate adaption unit and said second transcoding and rate adaption unit if said mobile switching center determines that said originating mobile station can be reached by said mobile switching center via said first transcoding and rate adaption unit and that said destination mobile station can be reached by said mobile switching center via said second transcoding and rate adaption unit, and that a traffic channel connection can be switched between said first transcoding and rate adaption unit and said second transcoding and rate adaption unit.

3. In a mobile radiotelephone network having a plurality of mobile stations and a mobile switching center, the improvement of a base station subsystem for producing a traffic channel connection between two of said mobile stations via said mobile switching center, said base station subsystem comprising:

at least two base stations respectively capable of establishing communication with said two mobile stations;

at least two base station control units, each of said base station control units controlling at least one of said base stations;

at least two transcoding and rate adaption units, each of said transcoding and rate adaption units connecting at least one of said base station control units to said mobile switching center; and at least two switching stages respectively directly connected to said at least two transcoding and rate adaption units, each switching stage comprising means for switching a useful connection between one of said mobile stations to another of said mobile stations via the respective base station control units.

* * * * *